Figure 1:
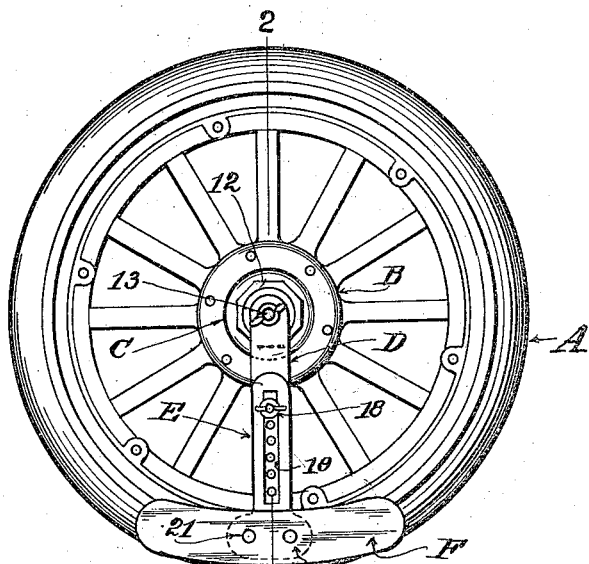

S. Q. STANLEY.
MUD GUARD FOR MOTOR VEHICLES.
APPLICATION FILED FEB. 8, 1917.

1,244,656.

Patented Oct. 30, 1917.

WITNESSES:
Al. Stark.
C. B. Knudsen.

INVENTOR:
SHIRLEY Q. STANLEY.
BY Michael J. Stark & Sons,
ATTORNEYS.

UNITED STATES PATENT OFFICE.

SHIRLEY Q. STANLEY, OF CHICAGO, ILLINOIS.

MUD-GUARD FOR MOTOR-VEHICLES.

1,244,656.

Specification of Letters Patent.

Patented Oct. 30, 1917.

Application filed February 8, 1917. Serial No. 147,309.

*To all whom it may concern:*

Be it known that I, SHIRLEY Q. STANLEY, a citizen of the United States, and a resident of the city of Chicago, in the county of Cook and State of Illinois, have invented a certain new and useful Improvement in Mud-Guards for Motor-Vehicles; and I do hereby declare that the following description of my said invention, taken in connection with the accompanying sheet of drawing, forms a full, clear, and exact specification, which will enable others skilled in the art to which it appertains to make and use the same.

My invention relates generally to improvements in mud guards for motor vehicles; and it consists, essentially, in the novel and peculiar combination of parts and details of construction, as hereinafter first fully set forth and described and then pointed out in the claim.

The object of this invention is the production of an efficient, serviceable, and convenient device for preventing the lateral or sidewise splashing of water, mud, and other road dirt by the wheels of vehicles, and especially automobiles and motor trucks. It is a well recognized fact that motor vehicles, such as street cars, automobiles, and auto trucks, when running on wet streets cause a very objectionable splashing of dirty water and mud laterally, or sidewise from the wheels, thereby annoying persons as well as other vehicles on account of the spattering they receive and the frequent ruining of expensive clothing worn by such persons.

This objection I have overcome by the device illustrated in the drawings, which comprises a dash plate suspended by bars from each of the hubs or axles of these vehicles on the flanks or outer side of the vehicle wheels, which plates are so constructed as to be adjustable and capable of being used in connection with any and all of the various diameters of automobiles and auto truck wheels.

Figures 2, 3, 4:
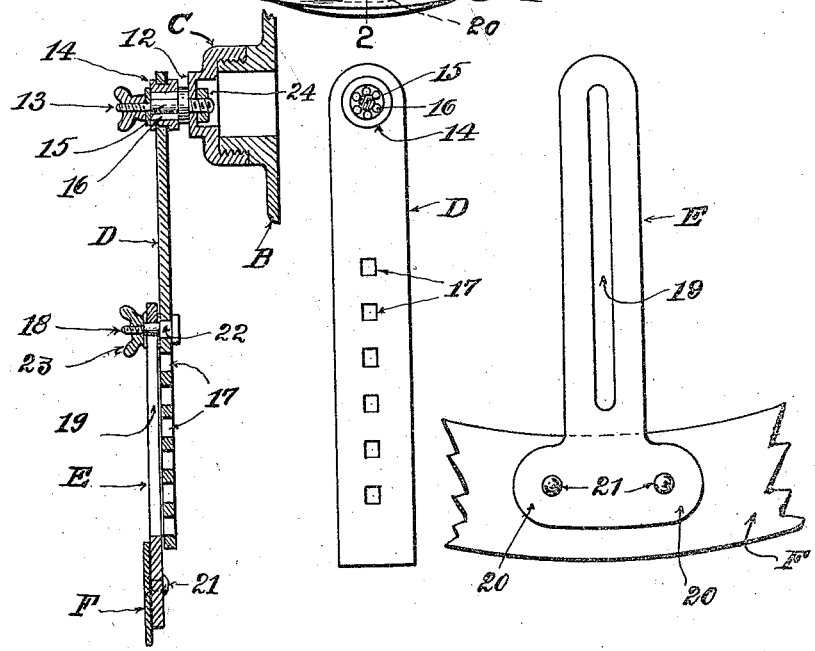

In the drawings, Figure 1 is a view of an automobile wheel of usual construction, to which my invention is applied. Fig. 2 is a longitudinal vertical section of the mud guard, on line 2—2 of Fig. 1. Fig. 3 is a plan view of one of the members or bars of this device, and Fig. 4 is a rear elevation of the second member of the guard.

A, in these drawings indicates a standard or conventional motor vehicle wheel, and B, the hub thereof, which hub is provided with the usual oil cap C, and, preferably to this oil cap my invention is applied. The front wall of this oil cap is centrally drilled and tapped to receive a pivot bolt 13, from which the mud guard is depending. This mud guard comprises, essentially, two members, of which D is a flat bar which I shall hereinafter term the depending bar, and E is a similar bar which will be hereinafter called the slotted bar, to which a guard plate or shield F, is properly attached.

The depending bar D has at its upper end a, preferably hardened, steel bushing 14, the bore of which is sufficiently larger than the shank 15 of the bolt 13, to admit roller or ball bearings 16, as indicated in Figs. 2 and 3. In the depending bar D there are a series of, preferably equally spaced bolt holes 17, round, as shown in Fig. 1, but preferably square, as illustrated in Fig. 3, to receive a correspondingly shaped bolt 18, by which the slotted member E is pivotally connected to the depending bar D. In this bar E there is a comparatively long slot 19, the object of which will hereinafter appear. To the lower end of this slotted bar E, which is, preferably, provided with laterally extending flanges 20, to increase the bearing surface thereof, the guard plate F is secured, preferably by rivets or other suitable means 21.

The guard plate or shield F is, preferably, an arcuate sheet metallic plate of proper length and width the lower edge of which is in close proximity to the ground over which the wheel is rolling. It can be readily removed when bent or deformed and replaced by a new one at a trifling expense.

The operation of this guard is substantially as follows:

The pendant member D is suspended from the bolt 13, which, when the vehicle is moving rotates with the wheel A. It is, therefore, preferably, provided with the roller bearing at its upper end to avoid friction as much as possible, and a possible swinging back and forth. The depending bar D is pivoted to the slotted bar E by the bolt 18, and is free to swing forward and backward so that should an obstruction be met by the guard plate or shield F, this part of the device may swing on its pivot, and if necessary, it may also rise vertically, due to the slotted aperture 19, until the obstruction has been passed, when the parts will resume their normal position by gravity.

The depending bar D is provided with the series of holes 17, to afford means for accommodating wheels of various diameters. Thus, let it be assumed that the wheel A shown in the drawings is a standard 28 inch wheel, the bolt 18 is inserted in the uppermost hole 17 in the bar D. For a wheel of larger diameter, this bolt 18 is placed into the corresponding lower hole 17, there being in this bar D a sufficient number of these holes, and their spacing apart so planned as to fit all the various diameters of wheels usual on vehicles of the nature described.

It is perfectly obvious that the plate or shield F, being as it is, close to the ground and on the outer flank or side of the vehicle wheel, any water or mud splashed by this wheel laterally, will be intercepted by the guard plate or shield F, thereby overcoming in an efficient and practical manner the hereinbefore mentioned objection to the lateral splashing of mud, etc., by the vehicle wheels.

Attention is now directed to the fact that this device does not in any manner interfere with, or obstruct, the removal of the tire from the wheel when necessary or desirable, because the lower, slotted member E can be raised a distance nearly equal to the length of the slot 19 therein, which will bring the shield out of the range of the tire; and if so desired, means, not shown, may be provided to retain the bar E in elevated position while the tire is being removed or replaced.

I prefer the square holes 17 which are engaged by the squared portion 22 of the bolt 18, to the round ones shown in Fig. 1, because this will permit of the nut 23 thereon being rotated without requiring the bolt being held against rotation.

Where the space between the inner face of the oil cap C and the end of the axle of the vehicle, not shown, is limited, the front wall 12 of this oil cap will be tapped to receive the bolt 13; but wherever possible, I shall employ a lock nut 24, Fig. 2, on this bolt to prevent possible unscrewing thereof.

While I have hereinbefore described the preferred embodiment of my invention, I desire it to be distinctly understood that changes may be made in the details of construction, and parts omitted without departing from the scope of my invention as defined in the subjoined claims.

Having thus fully described this invention I claim as new, and desire to secure to myself by Letters Patent of the United States—

A device of the nature described, including, a vehicle wheel, said vehicle wheel having centrally a hub, an oil cap in screw-threaded engagement with said hub, a stud bolt centrally secured to said oil cap and projecting therefrom, a flat rod pivotally mounted on said stud bolt and depending therefrom, there being in said rod a series of spaced apart, square holes, a second flat bar in front of said first-named bar, said second bar having at its lower extremity sidewise extending flanges, said second bar having longitudinally a long, slotted aperture, a shield secured to said flanges, and a bolt, said bolt having a squared portion engaging one of said squared apertures, a round portion engaging the slot in the second bar, and a thumb screw at its outer end, whereby the first mentioned bar may swing on said stud bolt, and the second bar swing on the bolt connecting the two bars, and move vertically on said bolt.

In testimony that I claim the foregoing as my invention, I have hereunto set my hand.

SHIRLEY Q. STANLEY.

Copies of this patent may be obtained for five cents each, by addressing the "Commissioner of Patents, Washington, D. C."